(12) United States Patent
Gondre et al.

(10) Patent No.: US 12,203,484 B2
(45) Date of Patent: Jan. 21, 2025

(54) DIFFERENTIATED SHORTENING OF STRANDS OF THE FIBROUS REINFORCEMENT OF A FAN BLADE

(71) Applicant: SAFRAN AIRCRAFT ENGINES, Paris (FR)

(72) Inventors: Guillaume Pascal Jean-Charles Gondre, Moissy-Cramayel (FR); Nicolas Paul Tableau, Moissy-Cramayel (FR); Julien Paul Schneider-Die-Gross, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/564,494

(22) PCT Filed: May 25, 2022

(86) PCT No.: PCT/FR2022/050992
§ 371 (c)(1),
(2) Date: Nov. 27, 2023

(87) PCT Pub. No.: WO2022/248804
PCT Pub. Date: Dec. 1, 2022

(65) Prior Publication Data
US 2024/0376902 A1  Nov. 14, 2024

(30) Foreign Application Priority Data

May 27, 2021 (FR) .................................. FR 2105514

(51) Int. Cl.
| F04D 29/38 | (2006.01) |
| F04D 19/00 | (2006.01) |
| F04D 29/02 | (2006.01) |

(52) U.S. Cl.
CPC ........ *F04D 29/388* (2013.01); *F04D 19/002* (2013.01); *F04D 29/023* (2013.01);
(Continued)

(58) Field of Classification Search
CPC . F01D 5/282; F04D 29/388; F05D 2300/6034
See application file for complete search history.

(56) References Cited

U.S. PATENT DOCUMENTS 3,679,324 A * 7/1972 Stargardter ............... F01D 5/30
416/241 A
3,752,600 A * 8/1973 Walsh ..................... F01D 5/282
415/217.1

(Continued)

FOREIGN PATENT DOCUMENTS

DE  10 2019 001 831 A1  10/2019
EP    3 511 240 A1   7/2019
(Continued)

*Primary Examiner* — Michael L Sehn
(74) *Attorney, Agent, or Firm* — Birch, Stewart, Kolasch & Birch, LLP

(57) ABSTRACT

The invention relates to a fan blade (3) of a turbomachine (15) comprising a structure (4) made of composite material having, within the root (5) and/or the stilt (6) of the blade, a first layer (11) comprising the lower face (16) and having a first thickness (E1) of between 10% and 25% of the total thickness (E), a second layer (12) comprising the suction face (17) and having a second thickness (E2) of between 10% and 25% of the total thickness (E), and a central layer (13) extending between the first layer (11) and the second layer (12), the shortening of the warp strands (9) in the first and second layers (11, 12) being greater than the shortening of the warp strands (9) in the central layer (13).

16 Claims, 4 Drawing Sheets

(52) U.S. Cl.
CPC .. *F05D 2220/36* (2013.01); *F05D 2300/2102* (2013.01); *F05D 2300/30* (2013.01); *F05D 2300/501* (2013.01); *F05D 2300/6034* (2013.01)

(56) References Cited

U.S. PATENT DOCUMENTS

| | | | |
|---|---|---|---|
| 4,040,770 A * | 8/1977 | Carlson | F01D 5/282 |
| | | | 416/241 A |
| 9,828,861 B2 | 11/2017 | Le Hong | |
| 10,174,624 B1 | 1/2019 | McCaffrey et al. | |
| 10,914,176 B2 | 2/2021 | Kamiya et al. | |
| 11,155,336 B2 | 10/2021 | Courtier | |
| 11,396,820 B2 | 7/2022 | De Gaillard et al. | |
| 11,738,521 B2 | 8/2023 | Tesson et al. | |
| 2008/0187441 A1 * | 8/2008 | Schreiber | B29C 70/202 |
| | | | 416/229 R |

FOREIGN PATENT DOCUMENTS

| | | |
|---|---|---|
| FR | 2 995 933 A1 | 3/2014 |
| WO | WO 2020/089344 A1 | 5/2020 |
| WO | WO 2021/005286 A1 | 1/2021 |

\* cited by examiner

DIFFERENTIATED SHORTENING OF STRANDS OF THE FIBROUS REINFORCEMENT OF A FAN BLADE

TECHNICAL FIELD

The disclosure generally relates to the field of turbomachines, and more particularly to that of fan blades made of composite material for these turbomachines and their manufacturing process.

The invention applies more particularly to ducted fan blades, in particular for turbomachines having a very high bypass ratio, as well as to unducted fan blades (or propellers) of the variable-pitch-type or stator for example variable-pitch stator in a USF—(acronym for Unducted Single Fan) type turbomachine having a rotor and a stator or open rotor with two rotors comparable to a fan module blade. Thus, in addition to an open rotor turbomachine fan rotor, the invention can also be applied to a propeller constituting a fan in the context of a turboprop engine.

BACKGROUND

Turbomachine blades, and in particular fan blades, undergo significant mechanical and thermal stress and must meet strict weight and size conditions. Therefore, it has been proposed to use blades in a composite material including a fibrous reinforcement densified by a polymer matrix, which are lighter compared to metal blades with equivalent propulsive characteristics and which have satisfactory heat resistance.

The blade stilt zone is heavily stressed in use, particularly in the interface zone of the blade with the fan disk. The centrifugal force resulting from the rotation of the fan rotor actually damages the blade in this interface zone. Depending on the shapes/designs chosen for the integration of this part in relation to the disk, this may result in local multi-axial stresses of the out-of-plane traction-type (that is to say in a direction substantially normal to the pressure face) and in out-of-plane shear between the different layers of the composite material.

In order to prevent these multiaxial stresses from being too localized, it was proposed to extend the blade root upstream. However, this also involves extending the fan disk and therefore negatively impacts the total mass of the fan module.

SUMMARY

A purpose of the disclosure is to overcome the aforementioned disadvantages, by proposing a fan blade for a turbomachine comprising a composite material reinforced by a matrix, the resistance to damage of which is improved, in particular in the stilt zone, without creating a fragile zone or increasing the mass of the fan section.

For this purpose, according to a first aspect, the disclosure proposes a fan blade of a turbomachine comprising a structure made of composite material comprising a root configured to be inserted into a cavity of a fan disk, a vane capable of extending in an air flow and a stilt extending between the root and the vane. The composite material structure has a pressure face, a suction face and a total thickness at the stilt, the total thickness being measured between the pressure face and the suction face in the stilt part in a plane normal to a stacking axis of the blade. The composite material structure is obtained by three-dimensional weaving of weft strands and warp strands.

Moreover, the composite material structure has, within the root and/or the stilt, a first layer comprising the pressure face and having a first thickness of between 10% and 25% of the total thickness, a second layer comprising the suction face and having a second thickness of between 10% and 25% of the total thickness, and a central layer extending between the first layer and the second layer. A shortening of the warp strands in the first and second layers is greater than a shortening of the warp strands in the central layer.

Certain preferred but non-limiting characteristics of the fan blade according to the first aspect are the following, taken individually or in combination:

- the warp strands within the composite material structure are stressed with a predetermined tension, the tension undergone by the warp strands of the central layer being greater than the tension undergone by the warp strands in the first and second layers;
- the weft strands within the composite material structure are stressed with a predetermined tension, the tension undergone by the weft strands of the central layer being lower than the tension undergone by the weft strands in the first and second layer within the root and/or the stilt;
- the tension undergone by the warp strands of the central layer is at least 100% greater than the tension undergone by the warp strands in the first and second layer, for example between 100% and 200%, and/or the tension undergone by the weft strands of the central layer is at least 100% lower than the tension undergone by the weft strands in the first and the second layer, for example between 100% and 200%;
- the first layer, the second layer and the central layer extend within the stilt and the root;
- the first layer, the second layer and the central layer extend within the stilt over a distance at least equal to 15% of the total thickness, preferably at least equal to 20% of the total thickness;
- the first thickness and the second thickness are substantially equal;
- the first thickness and the second thickness each comprise between 20% and 25% of the total thickness; and/or
- the weft and/or warp strands in the first layer and in the second layer have an elastic modulus comprised between 150 GPa and 190 GPa and may comprise glass or basalt fibers, and the weft and/or warp strands in the central layer have an elastic modulus comprised between 240 GPa and 350 GPa, preferably greater than or equal to 250 GPa, and may comprise carbon fibers.

According to a second aspect, the disclosure relates to a fan for a turbomachine comprising a plurality of fan blades in accordance with the first aspect.

According to a third aspect, the disclosure proposes a turbomachine comprising such a fan and an aircraft comprising this turbomachine.

According to a fourth aspect, the disclosure proposes an aircraft comprising at least one turbomachine according to the third aspect.

According to a fifth aspect, the disclosure proposes a woven loom configured to weave a composite material structure of a blade according to the first aspect, the woven loom being characterized in that a tension applied to the warp strands of the central layer is greater than a tension applied to the warp strands in the first and second layers.

DESCRIPTION OF THE FIGURES

Other characteristics, purposes and advantages will emerge from the description which follows, which is purely illustrative and not limiting, and which must be read with reference to the appended drawings in which.

In all of the figures, similar elements bear identical references.

DETAILED DESCRIPTION

Figure 1:
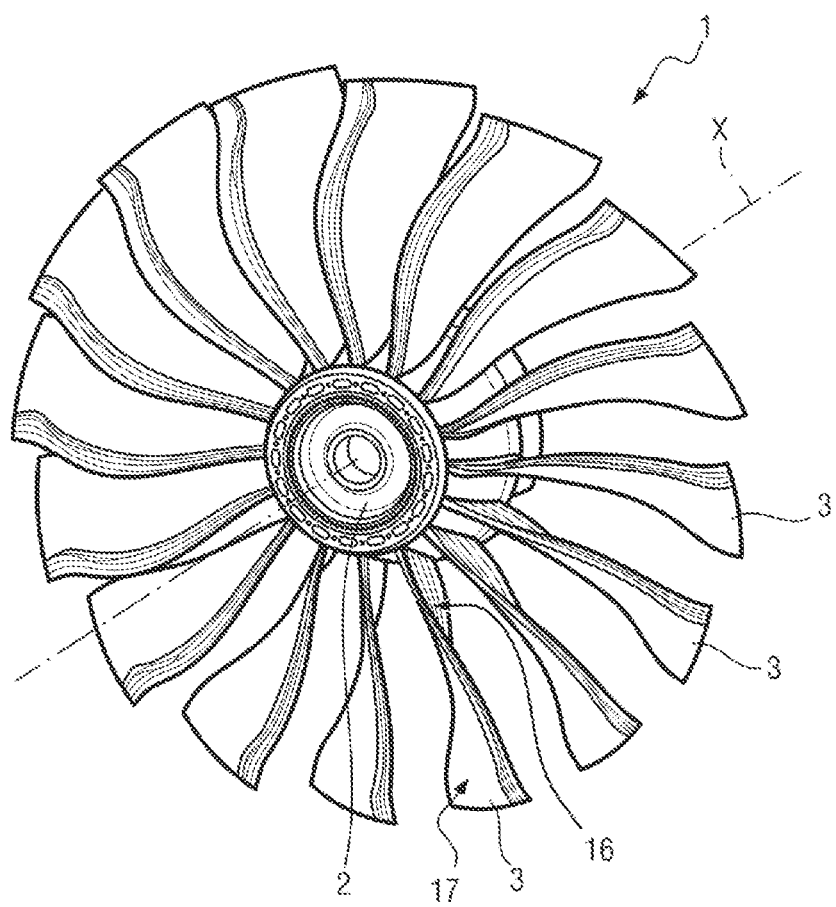
FIG. 1 illustrates an example of a fan according to one embodiment.
Figure 2:
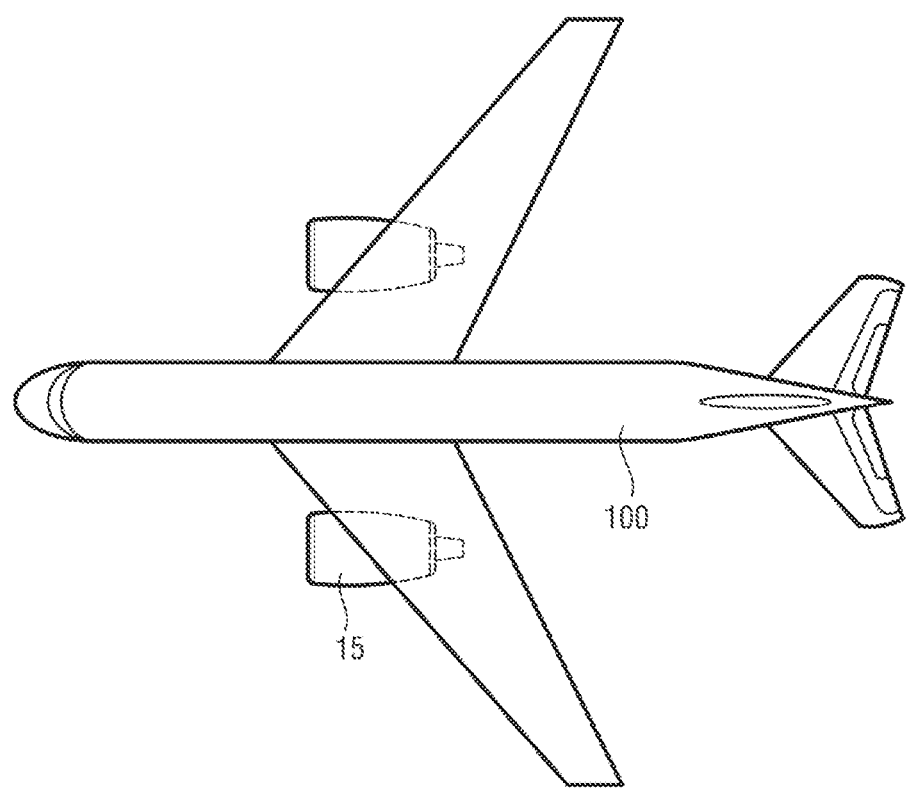
FIG. 2 is a schematic view of an example of an aircraft which may comprise at least one turbomachine in accordance with one embodiment.

In the present application, the upstream and downstream are defined in relation to the direction of normal flow of the gas in the fan 1 through the turbomachine 15. Moreover, the axis of revolution of the fan 1 is called the axis X of radial symmetry of the fan 1. The axial direction corresponds to the direction of the axis X of the fan 1, and a radial direction is a direction perpendicular to this axis and passing therethrough.

A fan 1 of a turbomachine 15 (for example a turbomachine 15 of an aircraft 100) comprises a disk 2 of a fan 1 carrying a plurality of blades 3 of a fan 1 associated with inter-blade platforms. The disk can comprise any vane support in a fan-type rotor, for example a solid disk defining cells or a blade support including in a rotor in which the blade is a variable-pitch blade by having the support allowing this variable pitch. These disks being known, they will not be described further here.

Each blade 3 comprises a composite material structure 4 including a fibrous reinforcement obtained by three-dimensional weaving and a matrix in which the fibrous reinforcement is embedded.

This composite material structure 4 comprises a root 5, a stilt 6 and a vane 7 with an aerodynamic profile. The root 5 is intended to allow the blade 3 to be fixed to the fan disk 2 and extends for this purpose between a bottom of a cavity formed in the disk 2 and the outlet 14 of the bearings of the cavity. The vane 7 with an aerodynamic profile is suitable for being placed in an air flow, when the turbomachine 15 is in operation, in order to generate lift. Finally, the stilt 6 corresponds to the zone of the vane 7 which extends between the root 5 and the vane 7, that is to say between the outlet 14 of the bearings (contact zones of the blade with the disk) and the inter-blade platforms (which internally delimit the secondary flow path). The stilt 6 is therefore not configured to extend in the air flow.

The blade 3 also comprises, in a manner known per se, a leading edge, a trailing edge, a pressure face 16 and a suction face 17. The leading edge is configured to extend facing the flow of the gas entering the turbomachine 15. It corresponds to the front part of an aerodynamic profile which faces the air flow and which divides the air flow into a pressure face flow and a suction face flow. The trailing edge in turn corresponds to the rear part of the aerodynamic profile, where the pressure face and suction face flows meet.

Finally, the structure is formed of a plurality of blade sections stacked from the root 5 along a stacking axis Y extending radially relative to the axis of revolution X of the fan 1.

In what follows, "height" will designate a distance along the stacking axis Y. Thus, the blade root 5 and the stilt 6 have a height corresponding to the distance along the stacking axis Y between the lower limit of the root 5 and the upper limit of the stilt 6 (at the intersection with the vane). "Thickness" will also designate a distance in a plane normal to the stacking axis Y and along an axis extending between the pressure face wall 16 and the suction face wall 17 which intersects the stacking axis Y.

The fibrous reinforcement of the composite material structure 4 can be formed from a single-piece fibrous preform obtained by three-dimensional or multilayer weaving with evolving thickness. It comprises warp 9 (that is to say strands extending along the stacking axis Y of the blade sections 3) and weft 10 (that is to say strands extending along the chord of the blade 3) strands which may in particular comprise fibers made of carbon, glass, basalt, and/or aramid. The matrix in turn is typically a polymer matrix, for example epoxy, bismaleimide or polyimide. The blade 3 is then formed by molding using a vacuum resin injection process of the RTM (for "Resin Transfer Molding"), or else VARTM—(for Vacuum Resin Transfer Molding) type.

Figure 3:
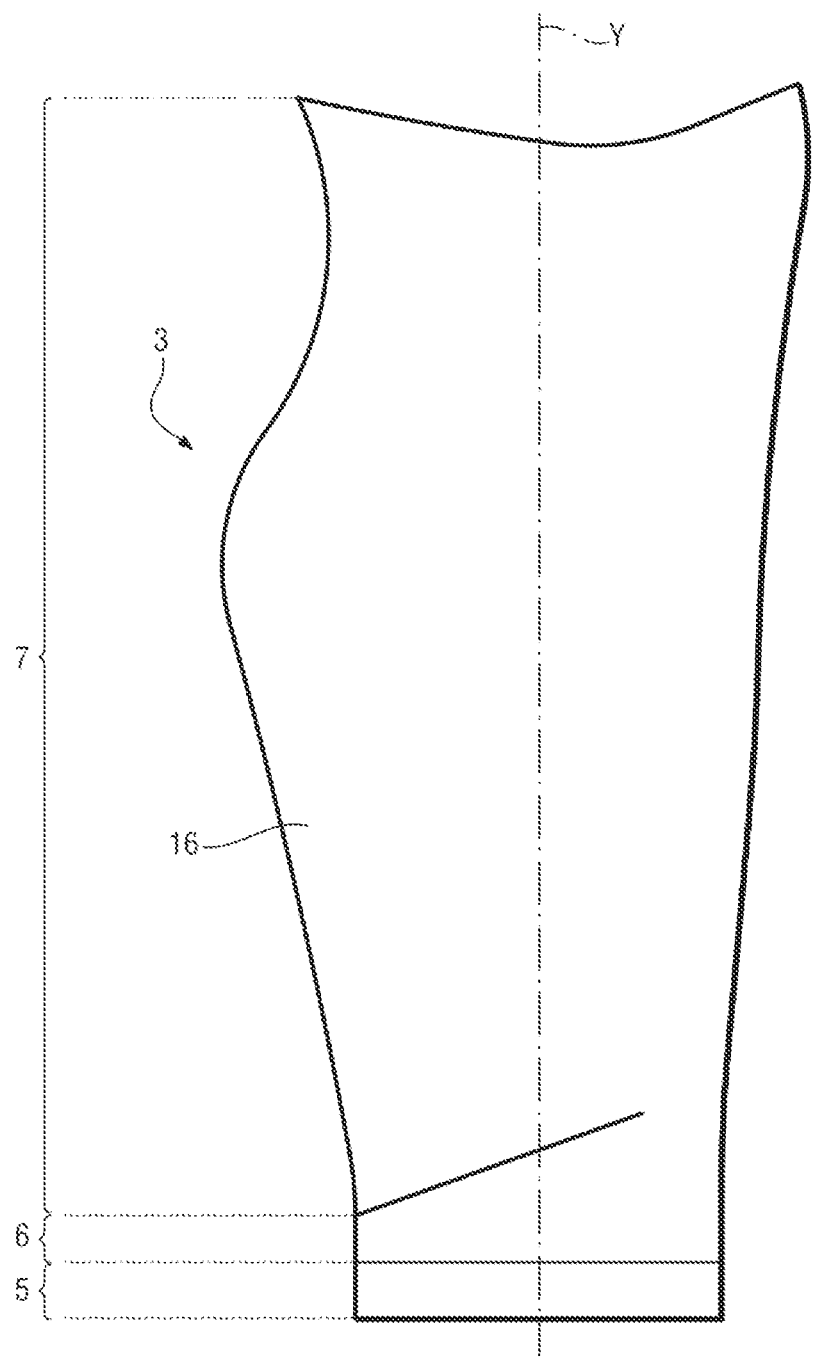
FIG. 3 is a schematic view of an example of a fan blade according to one embodiment.
Figure 4:
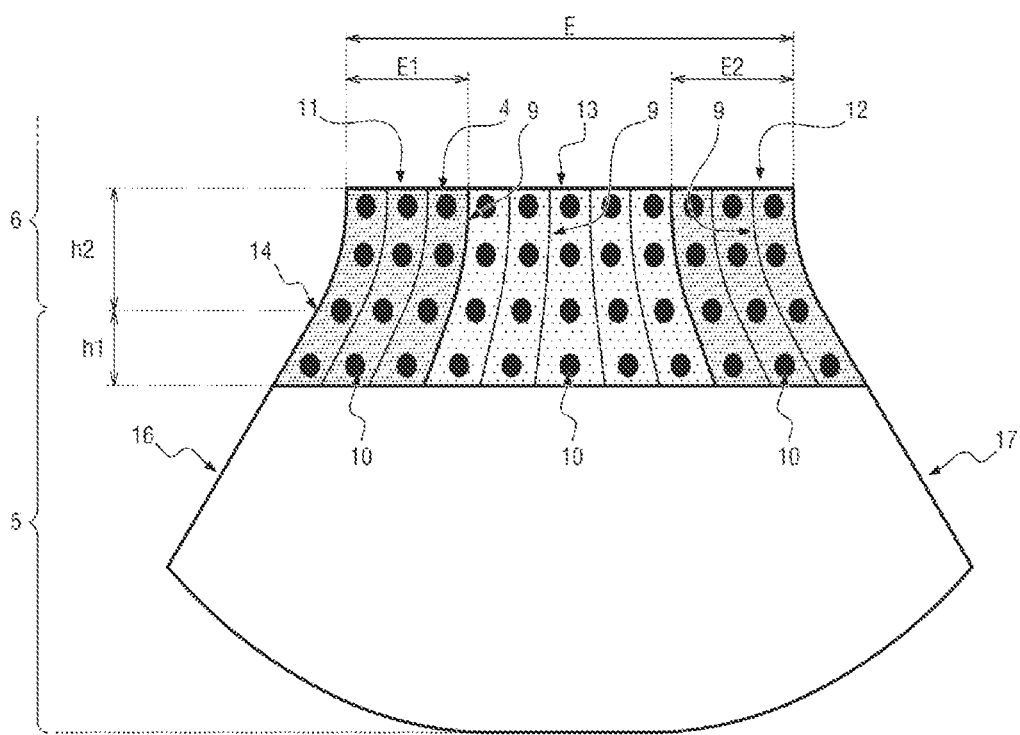
FIG. 4 is a partial sectional view of the composite material structure of the fan blade, FIG. 3 very schematically shows the warp strands and the weft strands in the first layer, the second layer and the central layer in accordance with one embodiment.

FIG. 3 schematically shows a blade 3 the fibrous reinforcement of which was shaped from a three-dimensional woven fibrous preform, before injection of resin or densification by a matrix and possible machining, in order to obtain a fan blade 3 made of composite material. By three-dimensional weaving, it will be understood that the warp strands 9 follow sinuous paths in order to bond together weft strands 10 belonging to layers of different weft strands 10, it being noted that three-dimensional weaving, in particular with interlock pattern, may include 2D surface weaves. Different three-dimensional weaving patterns can be used, such as interlock, multi-satin or multi-veil patterns, for example, as described in particular in document WO 2006/136755.

During weaving, a tension is applied to the warp strands 9 and the weft strands 10 in order to give them a differential stiffness and therefore a respective predetermined shortening. By shortening a strand, it is meant here the difference between the length of a given strand when it is perfectly straight and the actual length (in the fibrous reinforcement) of this strand due to the interlacing that it makes in order to tie with the other strands, and thus defining what is commonly called the woven pattern of the fibrous reinforcement. Shortening is generally expressed in percentages and thus characterizes the undulation of the strand. In a manner known per se, when a given strand is straight, its shortening is equal to 0%; the more undulated the strand, the higher its shortening.

The composite material structure 4 has, within the root 5 and/or the stilt 6, a first layer 11 comprising the pressure face 16 and having a first thickness E1 of between 10% and 25% of the total thickness E, a second layer 12 comprising the suction face 17 and having a second thickness E2 of between 10% and 25% of the total thickness E, and a central layer 13 extending between the first layer 11 and the second layer 12. The first layer 11 and the second layer 12 therefore form the skin of the blade 3 while the central layer 13 is at the core.

Total thickness E means here the thickness of the composite material structure 4 measured at mid-height of the stilt 6, at the leading edge.

In order to improve the resistance to damage of the fan blade 3, the warp strands 9 placed in the skin (that is to say in the first and second layers 11, 12) have a shortening greater than the warp strands 9 placed at the core (that is to say in the central layer 13) within the stilt 6 and/or the root 5. The composite material structure 4 is therefore more flexible in skin and stiffer at the core, which reduces the concentrations of the centrifugal charge near the skins.

Preferably, the first thickness E1 and the second thickness E2 are of between 20% and 25%. The first thickness E1 and the second thickness E2 can be substantially equal, to within 5%.

The difference in shortening of the warp strands 9 can be obtained by applying a different tension to the warp strands 9 and/or the weft strands 10 in the loom used to produce the fibrous reinforcement so that the tension undergone by the warp strands 9 at the core (in the central layer 13) is greater than the tension undergone by the warp strands 9 near the skins (in the first and second layers 11, 12) and/or the tension undergone by the weft strands 10 at the core is lower than that undergone by the weft strands 10 near the skins.

The applicant in fact noticed that the damage to the fan blade 3 was generally located at the skins of the blade 3, more precisely near the outlet 14 of the bearings, and that the warp strands 9 in the first and second layers 11, 12 were more loaded than the warp strands 9 in the central layer 13. The increase in the shortening of the warp strands 9 in the first and second layers 11, 12 of the fibrous reinforcement (and/or the reduction in the shortening of the warp strands 9 in the central layer 13) thus allows to make the warp strands 9 in the skin more flexible than the warp strands 9 in the core and to better distribute the load taken up by the warp strands 9 within the stilt 6 and the root 5.

In a first embodiment, the tension difference undergone by the warp strands 9 in the central layer 13 and in the first and second layers 11, 12 can be obtained by increasing the tension applied to the warp strands 9 in the central layer 13 and/or by reducing the tension applied to the warp strands 9 in the first and second layers 11, 12. For example the tension undergone by the warp strands 9 of the central layer 13 is at least 100% greater than the tension undergone by the warp strands 9 in the first and second layers 11, 12, for example between 100% and 200% higher.

In a second embodiment which can be combined with the first, the difference in shortening of the warp strands 9 in the central layer 13 and in the first and second layers 11, 12 can be obtained by reducing the tension applied to the weft strands 10 in the central layer 13 and/or by increasing the tension applied to the weft strands 10 in the first and second layers 11, 12. The modification of the tension applied to the weft strands 10 has in fact a direct impact on the tension undergone by the warp strands 9 near their interface and therefore their shortening and their stiffness. For example, the tension undergone by the weft strands 10 of the first and second layers 11, 12 is at least 100% higher than the tension undergone by the weft strands 10 in the central layer 13, for example between 100% and 200% higher. It will however be noted that the weft strands 10 undergo less friction because they are directly in contact with the warp strands 9 at the bottom level of the loom. The tension to be applied to the weft strands 10 can therefore be lower than to the warp strands 9 for an equivalent effect on the shortening of the warp strands 9.

It will be noted that the level of tension applied to a strand 9, 10 during the weaving process has a direct effect on its shortening, and therefore on the mechanical property in the direction of the strand. Thus, the reduction in the shortening of the warp strands 9 (and therefore the increase in their stiffness and their resistance to breaking) can be done by reducing the tension in the weft strands 10 or by increasing the tension in the warp strands 9. As indicated above, the reduction in the tension of the weft strands 10 and the increase in the tension of the warp strands 9 can be done in a coupled or dissociated manner in order to obtain a desired shortening reduction. The reasoning for reducing the shortening for one direction (for example in the warp strands) has the opposite effect for the shortening in the orthogonal direction (the weft strands 10).

The variation in tension applied by the loom to the warp 9 and/or weft strands 10 can be obtained by any adapted means, the principle being to exert a take-up tension directly at the output of the coil on which the strand is wound. In a manner known per se, this tension can be applied by a spring system pulling each warp strand 9, or using weights positioned between the exit of the warp strand 9 of the coil and the eyelets of the loom heddles. Moreover, coils allowing to control the applied tension are available on the market. Finally, the tension applied to the weft strands 10 can be managed in a similar manner as for the warp strands 9, and/or by using a clamp which grabs the end of the weft strand 10 and pulls it through the shed (interlacing of the warps), then releases the weft strand 10 once the beating of the loom has passed to the next sequence. These means for applying a tension to a (warp 9 or weft 10) strand being known per se, they will not be further detailed here.

Preferably, the first layer 11, the second layer 12 and the central layer 13 extend into the root 5 and the stilt 6 of the composite material structure 4. These are in fact the parts of the blade 3 which are susceptible to damage in operation by centrifugal loading.

When the tension difference is obtained by applying a different tension to the weft strands 10 of the central layer 13 and to the weft strands 10 of the first and second layers 11, 12, the first layer 11, the second layer 12 and the central layer 13 can extend over only part of the height of the blade 3. In this case, the three layers 11, 12, 13 extend near the outlet 14 of the bearings, in the stilt 6 and where appropriate in the root 5. In one embodiment, the three layers 11, 12, 13 extend on either side of the outlet 14 of the bearings, for example over a height h1 along the root 5 and a height h2 along the stilt 6 of between 15% and 25% of the total thickness E, preferably between 20% and 25% of the total thickness E (that is to say a total height h1+h2 of between 30% and 50% of the total thickness E).

When the tension difference is obtained by applying a different tension to the warp strands 9 of the central layer 13 and to the warp strands 9 of the first and second layers 11, 12, the first layer 11, the second layer 12 and the central layer 13 can extend over the entire height of the blade 3. Alternatively, the warp strands 9 in the first and second layers 11, 12 can where appropriate be gradually removed from the fibrous reinforcement at the upper limit of the first and second layers 11, 12 (at a distance of between 15% and 25% of the total thickness E, preferably between 20% and 25% of the total thickness E, from the outlet 14 of the bearings) and replaced by as many warp strands 9 undergoing a tension equivalent to that of the warp strands 9 in the central layer 13, in order to limit the property change gradients in the composite material structure (stiffness and breaking strength) which would be capable of weakening the blade 3.

It will be noted that the transition in the thickness between the first layer 11 (the second layer 12, respectively) and the central layer 13 can be progressive, that is to say that the tension applied to the warp strands 9 and/or the density of warp strands 9 undergoing greater tension gradually increases from the first layer 11 (respectively, from the second layer 12) towards the central layer 13. This transition of the properties of the warp strands 9 from the first layer 11

(respectively, the second layer 12) towards the central layer 13 can for example be produced on a thickness of between 2% and 8% of the total thickness E.

In order to further improve the flexibility of the composite material structure 4 near the skins, the weft 10 and/or warp 9 strands in the first layer 11 and the second layer 12 can be made of a material having a modulus of elasticity lower than that of the weft 10 and/or warp strands in the central layer 13. For example, the strands 9 and/or 10 in the first and second layers 11, 12 may have an elastic modulus comprised between 150 GPa and 190 GPa and may comprise glass or basalt fibers. The strands 9 and/or 10 in the central layer 13 may have an elastic modulus comprised between 240 GPa and 350 GPa, preferably greater than or equal to 250 GPa, and may comprise carbon fibers. In this way, the core strands 9, 10 ensure sufficient stiffness of the blade 3 allowing to respect the design criteria and guarantee its frequency status, while the skin strands 9, 10 limit the initiation and propagation of damage to the blade 3.

In general, the configurations described are valid for turbomachines 15 whose fan 1 can have an external diameter of the order of 1.8 meters to 3 meters. The number of blades 3 of the fan 1 can be equal to 16 or 18. Regardless of the diameter of the fan 1, the number of fan blades 3 will be reduced as much as possible.

The invention claimed is:

1. A fan blade of a turbomachine comprising a structure made of composite material comprising a root configured to be inserted into a cavity of a fan disk, a vane configured to extend in an air flow and a stilt extending between the root and the vane;
    wherein the structure has a pressure face, a suction face and a total thickness at the stilt, the total thickness being measured between the pressure face and the suction face in the stilt part in a plane normal to a stacking axis of the fan blade;
    wherein the structure is obtained by three-dimensional weaving of weft strands and warp strands;
    wherein the structure has, within at least one of the root and the stilt, a first layer comprising the pressure face and having a first thickness of between 10% and 25% of the total thickness, a second layer comprising the suction face and having a second thickness of between 10% and 25% of the total thickness, and a central layer extending between the first layer and the second layer, a shortening of the warp strands in the first and second layers being greater than a shortening of the warp strands in the central layer.

2. The fan blade according to claim 1, wherein the warp strands within the structure are stressed with a predetermined tension, the predetermined tension undergone by the warp strands of the central layer being greater than the predetermined tension undergone by the warp strands in the first and second layers.

3. The fan blade according to claim 2, wherein the predetermined tension undergone by the warp strands of the central layer is at least 100% greater than the tension undergone by the warp strands in the first and second layers.

4. The fan blade according to claim 1, wherein the weft strands within the structure are stressed with a predetermined tension, the predetermined tension undergone by the weft strands of the first and second layers being greater than the predetermined tension undergone by the weft strands in the central layer within at least one of the root and the stilt.

5. The fan blade according to claim 4, wherein the predetermined tension undergone by the weft strands of the first and second layers is at least 100% greater than the predetermined tension undergone by the weft strands in the central layer.

6. The fan blade according to claim 1, wherein the first layer, the second layer and the central layer extend within the stilt and the root.

7. The fan blade according to claim 6, wherein the first layer, the second layer and the central layer extend within the stilt over a distance at least equal to 15% of the total thickness.

8. The fan blade according to claim 6, wherein the first layer, the second layer and the central layer extend within the stilt over a distance at least equal to 20% of the total thickness.

9. The fan blade according to claim 1, wherein the first thickness and the second thickness are substantially equal.

10. The fan blade according to claim 1, wherein the first thickness and the second thickness each comprise between 20% and 25% of the total thickness.

11. The fan blade according to claim 1, wherein the weft strands and/or warp strands in the first layer and in the second layer have an elastic modulus between 150 GPa and 190 GPa, and wherein the weft strands and/or warp strands in the central layer have an elastic modulus between 240 GPa and 350 GPa.

12. The fan blade according to claim 11, wherein the weft strands and/or warp strands in the first layer and in the second layer comprise glass strands or basalt fibers.

13. The fan blade according to claim 11, wherein, and the weft and/or warp strands in the central layer have an elastic modulus greater than or equal to 250 GPa and less than or equal to 350 GPa and comprise carbon fibers.

14. A fan comprising the disk and a plurality of fan blades according to claim 1, the fan blades fixed to the disk.

15. A turbomachine comprising the fan according to claim 14, wherein the fan is ducted or unducted.

16. An aircraft comprising at least one turbomachine according to claim 15.

* * * * *